United States Patent
McDade et al.

(10) Patent No.: US 8,814,464 B2
(45) Date of Patent: Aug. 26, 2014

(54) RECYCLED RECLAIMED ASPHALT PAVEMENT

(71) Applicant: Western Emulsions, Inc., Dana Point, CA (US)

(72) Inventors: Billy Shane McDade, Austin, TX (US); Joe Platt, Dana Point, CA (US); Andrew Clayton, Dana Point, CA (US)

(73) Assignee: Western Emulsions, Inc., Dana Point, CA (US)

( * ) Notice: Subject to any disclaimer, the term of this patent is extended or adjusted under 35 U.S.C. 154(b) by 0 days.

(21) Appl. No.: 13/751,705

(22) Filed: Jan. 28, 2013

(65) Prior Publication Data

US 2013/0195552 A1   Aug. 1, 2013

Related U.S. Application Data

(60) Provisional application No. 61/591,769, filed on Jan. 27, 2012.

(51) Int. Cl.
| | | |
|---|---|---|
| *E01C 7/00* | (2006.01) | |
| *E01C 21/00* | (2006.01) | |
| *C08L 95/00* | (2006.01) | |
| *E01C 19/48* | (2006.01) | |
| *E01C 7/24* | (2006.01) | |
| *E01C 7/18* | (2006.01) | |

(52) U.S. Cl.
CPC ............... *C08L 95/005* (2013.01); *E01C 19/48* (2013.01); *C08L 2555/40* (2013.01); *E01C 7/24* (2013.01); *C08L 2555/28* (2013.01); *E01C 7/187* (2013.01); *C08L 2555/34* (2013.01)
USPC .................................. 404/75; 404/17; 404/36

(58) Field of Classification Search
CPC .......... E01C 21/00; E01C 7/00; C08L 95/005
USPC ..................... 404/17, 36, 75–77, 90, 91, 101, 404/102–106, 108–111, 113, 114, 117–122
See application file for complete search history.

(56) References Cited

U.S. PATENT DOCUMENTS

| | | | |
|---|---|---|---|
| 4,661,378 A | | 4/1987 | McGovern |
| 5,180,428 A | | 1/1993 | Koleas |
| 6,599,057 B2 * | 7/2003 | Thomas et al. ................. 404/72 |
| 6,902,610 B2 * | 6/2005 | Guerin et al. ................. 106/277 |
| 6,966,723 B2 * | 11/2005 | Zentner ........................... 404/17 |
| 7,137,305 B2 * | 11/2006 | McKemie et al. .............. 73/803 |
| 7,275,890 B2 * | 10/2007 | Thomas et al. ................. 404/75 |
| 7,357,594 B2 | 4/2008 | Takamura |
| 7,833,338 B2 * | 11/2010 | Crews et al. ................. 106/277 |
| 8,083,434 B1 * | 12/2011 | Gorman et al. ................. 404/75 |
| 2003/0215286 A1 * | 11/2003 | Takamura ....................... 404/17 |

* cited by examiner

*Primary Examiner* — Raymond W Addie
(74) *Attorney, Agent, or Firm* — Dorsey & Whitney LLP

(57) ABSTRACT

The present disclosure generally relates to formulations of, and methods of making and using, recycled reclaimed asphalt pavement.

25 Claims, No Drawings

RECYCLED RECLAIMED ASPHALT PAVEMENT

CROSS REFERENCE TO RELATED APPLICATION

This application claims the benefit of priority under 35 U.S.C. §119(e) to U.S. Application No. 61/591,769, filed Jan. 27, 2012, titled "Recycled Reclaimed Asphalt Pavement," and which is hereby incorporated by reference in its entirety.

TECHNICAL FIELD

The present disclosure generally relates to formulations of, and methods of making and using, recycled reclaimed asphalt pavement.

BACKGROUND

Recycled reclaimed asphalt pavement ("RAP") is asphalt pavement that has been removed from a surface, mixed with additives and reapplied to a surface. Recycling RAP via the Cold Central Plant ("CCP") process has been performed for many years by various departments of transportation and roadway authorities. CCP-produced recycled RAP has been used for various purposes, including shoulder widening, pothole patching and as a base material. However, CCP-produced recycled RAP has not been considered appropriate for use as a wearing course because it lacks the required structure and density. Reasons for these shortcomings include deficiencies in the asphalt emulsions used in the recycling process, improper manufacturing techniques, stockpile management and application, and deficiencies in the design process.

CCP-produced recycled RAP has often been stored in outdoor stockpiles after processing and then used as needed. However, CCP-produced recycled RAP has rarely been stockpiled for longer than 3 months because it does not remain "lively," that is, with a high content of uncured, unbroken asphalt.

RAP has also been recycled using asphalt emulsions or "cutbacks" that contain volatile solvents, such as diesel fuel or kerosene, which have been considered necessary to rejuvenate the latent oxidized asphalt in the RAP and to extend stockpile life. However, the solvents proved to be harmful to the environment and to workers involved in their production and use. Further, use of volatile solvents creates added costs that limit the cost-effectiveness of the RAP recycling process.

Additionally, the variety and size of conventional recycled RAP particles has limited the efficacy and predictability of recycling RAP. Recycled RAP formulations having more predictable compositions, fewer or no volatile solvents, and longer stockpile life, along with methods of making and using the same, are needed.

In previous formulations of recycled RAP, the amount of emulsion is typically 3-3.5%, and greater than 2.75%.

The information included in this Background section of the specification is included for technical reference purposes only and is not to be regarded as subject matter by which the scope of the description is to be bound or as an admission of prior art.

SUMMARY

The present disclosure is directed to new formulations of, and uses for, recycled RAP. A formulation of recycled RAP includes RAP, an emulsion and water. The RAP can have specific size gradations. Further, emulsions in the recycled RAP are substantially free of volatile solvents. The emulsions can be provided in lower quantities than in conventional recycled RAP. Recycled RAP has a longer stockpile life than conventional recycled RAP.

Methods of making recycled RAP include fractionating RAP to satisfy certain size constraints, and combining the fractionated RAP with various quantities of emulsions substantially lacking volatile solvents, and with water. A method of using recycled RAP includes applying fractionated RAP, an emulsion and water to a surface and then compacting the materials.

DETAILED DESCRIPTION

The present disclosure provides formulations of, and methods of making and using, recycled RAP. More specifically, the formulations and methods allow for the production of recycled RAP having particles that conform to various size gradations, and without the use of volatile solvents. The formulations and methods also allow for the production of recycled RAP that can remain lively in a stockpile for extended periods of time. Recycled RAP produced by the methods disclosed herein can be used for any paving purpose, including as a wearing course.

Components of the recycled RAP formulations include reclaimed asphalt pavement and an asphalt emulsion, which can include various components as described in more detail below.

Reclaimed Asphalt Pavement

RAP is asphalt paving material that has been removed from a paved surface. Asphalt paving material can be removed from a paved surface by any process known in the art including, but not limited to, rotomilling, scraping and scarifying. RAP contains asphalt and one or more aggregates. Often the asphalt and aggregates have undergone various physical and rheological changes during construction and service. RAP can be reprocessed and reused in new asphalt materials.

Recycled RAP can be produced without the addition of sand, which is an aggregate that passes through a ¼-inch sieve. Without being limited to any mechanism or mode of action, emulsion (as described below) coats RAP particles indiscriminately. More emulsion (e.g. emulsion in excess of 2.5 w/w %) is used to coat sand particles than RAP particles. Use of emulsion amounts that coat sand particles can lead to over-coated RAP particles. Use of emulsion amounts that coat RAP particles can lead to under-coated sand particle.

RAP can be fractionated by crushing and selecting particles below a specific particle size. For example, RAP can be fed into a small impact crusher, and the resulting material can be sent across one or more sieves or screens to separate out particles above a specific size. Oversized material can be returned to the crusher and crushed again. Alternatively, RAP can be screened before being crushed.

RAP can be selected to include only RAP particles having a specific size. In some embodiments, the RAP passes through a 38.1-mm (1½-inch) sieve. Alternatively, a 31.75-mm (1¼-inch) sieve, a 25.4-mm (1-inch) sieve or a 19.0-mm (¾-inch) sieve can be used. These result in RAP particles having less than 1½ inches in diameter, less than 1¼ inches in diameter, less than 1 inch in diameter or less than ¾ inch in diameter, respectively.

Emulsions

Emulsions are added to the recycled RAP. Emulsions can include any asphalt emulsion known in the art. In general, an asphalt emulsion includes asphalt particles dispersed through a solution of water and a chemical surfactant. Asphalt emulsions can also contain other agents including, but not limited to, polymers, solvents and rejuvenators.

Asphalt emulsions can be made by combining asphalt particles, water and surfactant using a high shear mechanical device, such as a colloid mill. The colloid mill can shear the asphalt into tiny droplets that are dispersed through and stabilized in the water by the surfactant. Various other methods of combining asphalt particles and surfactants can be used.

Additional examples of asphalt emulsions include engineered emulsions. Examples of engineered emulsions include, but are not limited to, Fortress (Road Science, LLC, Tulsa, Okla.), PASS-R (Western Emulsions, Inc., Dana Point, Calif.), and ReFlex (Road Science, LLC, Tulsa, Okla.).

A. Asphalt

Asphalt emulsions include asphalt (bitumen). Asphalt can be any emulsifiable asphalt known in the art. Asphalt can be naturally occurring or manufactured. Manufactured asphalt can be the residual product of the nondestructive distillation of crude oil in petroleum refining.

Asphalt can be comprised of an asphaltene fraction dispersed in a maltene fraction. The asphaltene fraction is insoluble in n-pentane and soluble in toluene. Molecular components of the asphaltene fraction can be high in molecular weight, polarity and/or aromaticity. The maltene fraction can include resins, aromatic oils (aromatics) or saturate oils (saturates). The maltene fraction can include molecules ranging from non-polar, such as saturates, to polar, such as resins. Asphalt can be elastic, thermoplastic, viscous and/or waterproof.

Asphalt can meet any roadway specification known in the art. Examples of roadway specifications include, but are not limited to, ASTM D946/D946M-09a (ASTM International, "Standard Specification for Penetration-Graded Asphalt Cement for Use in Pavement Construction," Road and Paving Materials (2011)), ASTM D3381/D3381M-09a (ASTM International, "Standard Specification for Viscosity-Graded Asphalt Cement for Use in Pavement Construction," Road and Paving Materials (2011)) and ASTM D6373-07e1 (ASTM International, "Standard Specification for Performance Graded Asphalt Binder," Road and Paving Materials (2011)).

Asphalt can be acquired from any region. Regions can be described as Petroleum Administration Defense Districts (PADDs). Asphalt can be obtained from any PADD, including PADD 1, PADD 2, PADD 3, PADD 4 and PADD 5.

Asphalt can be acquired from any refiner or supplier. Examples of refiners and suppliers include, but are not limited to, Alon, BP, Calumet, Cenex, Conoco Phillips, Exxon/Mobil, Flint Hills Resources, Frontier, Holly, Husky, Imperial, Marathon, Montana Refining, Moose Jaw, Murphy Oil, NuStar, Paramount, San Joaquin, Shell, Silver Eagle, Sinclair, Suncor, Tesoro, US Oil, Valero, Western Refining, World, WRB and Wynnewood.

Asphalt can be modified with one or more polymers. Modification can be performed prior to emulsification. For example, a dry polymer can be melted into an asphalt stock.

Without being limited to any mechanism or mode of action, asphalt helps bind recycled RAP particles together. Polar molecules within asphalt adhere to polar molecules on RAP surfaces. The molecular components of asphalt form dipolar intermolecular bonds of varying strength. These intermolecular bonds for a molecular network. Changes in the molecular network, including changes over time, can lead to failure of an asphalt or asphalt paving material. For example, asphalts with higher percentages of non-polar dispersing molecules can flow and plastically deform as the polar molecules move relative to one another and to the non-polar molecules. Alternatively, if the network is relatively simple and not interconnected, asphalt can deform inelastically under loads, which can lead to rutting and permanent deformation. If a network is too organized, such as when a high percentage of polar molecules is present, it can become rigid and fracture, which can lead to fatigue cracking. At lower temperatures, the non-polar molecules can become more structured, which can make asphalt more rigid and more likely to fracture, which can lead to thermal cracking. Further, water can disrupt the bonds between polar molecules in asphalt and polar molecules on RAP surfaces, which can lead to decreased viscosity, increased rutting, reduced strength and/or stripping.

B. Surfactants

The emulsions also include one or more surfactants. Without being limited to any mechanism or mode of action, surfactants hold asphalt particles in suspension and stabilize an emulsion. Reducing the amount of surfactant in an emulsion can lead to a shorter setting time and/or shorter curing time during the paving process.

1. Cationic

Asphalt emulsions can be cationic. Surfactants in cationic asphalt emulsions can be derived from long-chain fatty acids and their acidic salts. The fatty acids can be derivatives of naturally occurring oils and fats, or they can be synthetic. In some embodiments, the fatty acids can be amidoamines, imidazolines, fatty amines, fatty diamines, fatty quaternary ammonium compounds or ethoxylated derivatives. The nonpolar tails of the fatty acids are hydrophobic and can align inward toward the asphalt particles. The polar ends of the fatty acids are hydrophilic and can provide solubility in water. The surfactant molecules that surround an asphalt particle can impart a positive charge to the surface of the asphalt particle. The emulsion can be a blend of more than one surfactant. Examples of cationic surfactants include, but are not limited to, AA-86, AA-89, SBT and W-5 of the Indulin brand (MeadWestvaco Corp., Charleston, S.C.), E-9, E-11, E-4819, E-4875 and EM24 of the Redicote brand (AkzoNobel, Amsterdam, Netherlands), and Catamine 101 (ArrMaz Custom Chemicals, Mulberry, Fla.).

In other embodiments, the emulsion is a polymer-modified cationic slow setting emulsified asphalt. A polymer-modified cationic slow setting emulsified asphalt can be any asphalt emulsion known in the art that includes polymers (as described below) is cationic (as described above) and is slow setting (as described below). A preferred emulsion is PASS-R (Western Emulsions, Inc., Dana Point, Calif.).

In many embodiments, the emulsion is a polymer-modified cationic slow setting emulsified asphalt with a solvent-free rejuvenator. A polymer-modified cationic slow setting emulsified asphalt with a solvent-free rejuvenator can be any polymer-modified cationic slow setting emulsified asphalt (as described above) with a solvent-free rejuvenator (as described below). A preferred emulsion is PASS-R (Western Emulsions, Inc., Dana Point, Calif.).

2. Anionic

Asphalt emulsions can be anionic. Surfactants in anionic asphalt emulsions can be derived from long-chain fatty acids reacted with a base to form a salt. Such fatty acids can be derivatives of naturally occurring oils and fats, or they can be synthetic. In some embodiments, the fatty acids can be wood or paper-processing derivatives such as hydoxystearic acid, lignin sulfonates, rosin acids or tall oil fatty acids. In other embodiments, the fatty acids can be petroleum sulfonates such as alphaolefin sulfonates. In still other embodiments, the fatty acids can be from lauric, linoleic, myristic, palmitic, oleic or ricinoleic acids. In some embodiments, the base can be caustic potash (KOH) or caustic soda (NaOH). The nonpolar tails of the fatty acids are hydrophobic and can align inward toward the asphalt particles. The polar ends of the fatty acids are hydrophilic and can provide solubility in water. The surfactant molecules that surround an asphalt particle can impart a negative charge to the surface of the asphalt particle. Examples of an anionic surfactants include, but are not limited to, some of the Indulin brand of surfactants, such as W-5 (MeadWestvaco Corp., Charleston, S.C.).

3. Nonionic

Asphalt emulsions can be nonionic. Surfactants in nonionic asphalt emulsions can be derived from neutrally charged long-chain fatty acids. The fatty acids can be derivatives of naturally occurring oils and fats, or they can be synthetic. In some embodiments, the surfactant in nonionic asphalt emulsions can include long chain polyoxyethylene or polyoxypropylene groups in fatty acid, alcohol, amide or amine molecules. These surfactants can be hydrophilic due to oxygenated side chains (i.e., polyoxyethylene or polyoxypropylene chains combined with the oil-soluble fatty acid, alcohol amine or amide component of the molecule). Emulsions can include a blend of more than one surfactant. One example of a nonionic surfactant is the Witconol brand of nonyl phenol ethoxylates (AkzoNobel, Amsterdam, Netherlands).

C. Rejuvenators

Asphalt emulsions can also contain one or more rejuvenators. An example of a rejuvenator is a composition derived from coal tar and comprising a mixture of di-, tri- and tetra-cyclic aromatic compounds and their alkyl homologs containing lower alkyl groups together with a significant amount of phenolic and hydroxy derivatives (McGovern, U.S. Pat. No. 4,661,378).

Another example of a rejuvenator is a recycling agent. For example, a recycling agent can contain the maltene fraction of asphalt (as described below). In some variations, a recycling agent can contain a subset of the maltene fraction of asphalt such as one or more of polar resins, aromatic oils or saturate oils. Alternatively, the recycling agent can contain a relatively high percentage of aromatic oils and polar materials. Examples of suitable recycling agents include an RA-1 grade recycling agent, the Hydrolene brand of asphalt modifiers (HollyFrontier/Sunoco, Tulsa, Okla.) and the Cyclogen and Reclamite brands of asphalt preservations materials (Tricor Refining, LLC, Bakersfield, Calif.).

Asphalt emulsions also can be rejuvenating asphalt emulsions. One example of a rejuvenating asphalt emulsion is a composition that includes a predominantly maltene recycling agent, a rubbery polymer or latex selected from styrene-butadiene-styrene, styrene butadiene rubber, neophrene latex and natural rubber, an surfactant, and water (Koleas, U.S. Pat. No. 5,180,428). Another example is a composition that includes an asphalt binder, water, a cationic surfactant, a recycling agent and a cationic co-agglomerated styrene butadiene rubber latex, which includes sulfur and a vulcanizing agent (Takamura, U.S. Pat. No. 7,357,594).

Without being limited to any mechanism or mode of action, rejuvenators and rejuvenating asphalt emulsions increase the life span of asphalt pavement. Rejuvenators and rejuvenating asphalt emulsions can penetrate asphalt to restore essential oils (maltenes), soften asphalt, revitalize or reactivate binder properties, help RAP adhere to and repair damage within the asphalt matrix. Rejuvenators and rejuvenating asphalt emulsions can increase ductility, increase flexibility, reduce viscosity, reduce brittleness, reduce ravel and enrich oxidized pavement. Rejuvenators and rejuvenating asphalt emulsions can form a polymer-rich, thin, stress-absorbing membrane that can strongly adhere to an underlying pavement. Rejuvenators and rejuvenating asphalt emulsions can seal pavement and can make pavement resistant to fuels, oils, water and salts.

In some embodiments, the emulsion includes a solvent-free rejuvenator. Solvent-free rejuvenators can be rejuvenators (as described above) without volatile solvents. Without being limited to any mechanism or mode of action, solvent-free rejuvenators can increase stockpile life of recycled RAP.

D. Polymers

Asphalt emulsions can also contain one or more polymers. A polymer can be natural or synthetic. Example polymers include, but are not limited to, acrylic, acrylic terpolymer, acrylonitrile-butadiene, butyl rubber, ethylene methacrylate copolymer, ethylene vinyl acetate copolymer, ethylene vinyl chloride, natural rubber, neoprene, nitrile, polyurethane, polyvinylidene chloride, polyvinyl acetate, polyvinyl alcohol, silicone, vinylacrylic, vinyl acetate-ethylene, vinyl ester copolymer, and block copolymers such as styrene acrylate, styrene butadiene, styrene-ethylene-vinyl acetate and sytrene-isoprene. Polymers can be added to an emulsion in any form known in the art including, but not limited to, crumb, pellet, powder or water-suspended form. Suitable polymers include PA-AS-1 (Polymer Science of America, LLC, Tuscon, Ariz.).

Polymers can be added to asphalt prior to emulsification. For example, a dry polymer can be melted into an asphalt stock.

Without being limited to any mechanism or mode of action, polymers modify the physical properties of asphalt. Polymers can dissolve into some component fractions of asphalt such that the polymer molecules create an inter-connected matrix of polymer through the asphalt. Polymers can be thermoplastic and break up, such as into monomers, when exposed to heat (for example, during some asphalt pavement mixing and laying steps) and recombine at lower temperatures (for example, ambient temperatures).

Polymers can add strength, increase elasticity, increase ductility, decrease brittleness, improve adhesion, improve cohesion, increase durability, extend life and improve temperature stability of a recycled RAP. Polymers can reduce pavement cracking, such as that caused by thermal stresses and repetitive loads. Polymers can decrease rutting, such as that due to plastic or inelastic deformations of asphalt pavement mixtures. Polymer-modified asphalt emulsions can be less brittle at low temperatures to resist cracking. Polymer-modified asphalt emulsions can be stiffer at high temperatures to resist rutting and bleeding.

In some embodiments, polymers in an asphalt emulsion improve structural stability of a recycled RAP. Structural stability can include resistance to forces, such as shear and bending forces, and resistance to plastic flow. Structural stability can be determined by Marshall Stability testing. Marshall Stability tests are used to measure the resistance to plastic flow of cylindrical specimens of asphalt mixtures loaded on the lateral surface by means of the Marshall apparatus. Marshall Stability tests can be performed according to ASTM D5581-07ae1, Standard Test Method for Resistance to Plastic Flow of Bituminous Mixtures Using Marshall Apparatus (6 inch Diameter Specimen) or ASTM D6927-06, Standard Test Method for Marshall Stability and Flow of Bituminous Mixtures, which are incorporated herein by reference in their entirety.

E. Solvents

In some embodiments, the emulsion is free of volatile solvents (or as referred to herein, "solvent-free"). Without being limited to any mechanism or mode of action, the absence of volatile solvents can increase stockpile life of recycled RAP.

"Volatile solvents" include any organic compound with an initial boiling point ("IBP") of 500° F. or less as determined by ASTM D244-09 (ASTM International, "Standard Test Methods and Practices for Emulsified Asphalts," Road and Paving Materials (2011)). Examples of solvents include, but are not limited to, diesel fuel, fuel oil, gasoline, jet fuel, kerosene and naphtha. A "solvent-free" emulsion is an emulsion that contains no organic compound with an IBP of 500° F. or less.

In some variations, the emulsion can be substantially solvent-free. An emulsion that is substantially solvent-free can include less than 0.5% by volume of a volatile solvent.

F. Water

Asphalt emulsions include water. An asphalt emulsion can be more than 15% water. In some embodiments, an asphalt emulsion is more than 25% water. In other embodiments, an asphalt emulsion is more than 35% water.

An asphalt emulsion can be less than 55% water. In some embodiments, an asphalt emulsion is less than 45% water. In other embodiments, an asphalt emulsion is less than 35% water.

Emulsion Setting

Asphalt emulsions can coalesce (i.e., set or break) under a variety of conditions. For example, when an asphalt emulsion and an aggregate are oppositely charged, electrostatic attraction between the particles can lead to flocculation and coalescence. Without being limited to any mechanism or mode of action, when an asphalt emulsion and an aggregate carry the same charge, the particles often are forced together, such as by pumping at high shear or freezing, before flocculation and coalescence can occur. Removing water by any method, such as by heating to cause evaporation, can also lead to flocculation and coalescence.

Asphalt emulsions can set at different rates. The actual setting times in the field depend not only on the type of emulsion used, but also upon other factors. For example, ambient temperature, humidity and wind speed affect water evaporation rates, surfactant migration and surfactant water release characteristics. These effects can change the rate at which emulsion in a recycled RAP sets. Alternatively, the size distribution and number of fine aggregates in recycled RAP can accelerate the setting rate. Alternatively, intensity of the charge on the surface of RAP particles can affect the setting rate. High surface charge can lead to more rapid setting. Alternatively, cool emulsion and RAP temperatures can retard setting. Warm or hot emulsion and RAP temperatures can accelerate setting. Alternatively, compactive effort can affect the setting rate.

A. Slow Setting

Asphalt emulsion can be slow setting. Slow setting emulsions are largely unreactive and highly stable. They can be used with reactive aggregates. When slow setting emulsions are used with fine aggregates, they allow for maximum mixing time and extended workability. Slow setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of slow setting emulsions include, but are not limited to, CSS-1, CSS-1h, SS-1 and SS-1h.

B. Rapid Setting

Asphalt emulsion can be rapid setting. Rapid setting emulsions are reactive and can be used with largely unreactive aggregates. Rapid setting emulsions can set quickly when used with coarse aggregates. Rapid setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of rapid setting emulsions include, but are not limited to, CRS-1, CRS-2, CRS-2h, CRS-2p, LMCRS-2, LMCRS-2h, RS-1, RS-2, RS-1h and RS-2h.

C. Medium Setting

Asphalt emulsion can be medium setting. Medium setting emulsions can set less quickly than rapid-setting emulsions when used with coarse aggregates. Medium setting emulsions can set more quickly than slow-setting emulsion when used with fine aggregates. Medium setting emulsions can be described by ASTM D977-05 (ASTM International, "Standard Specification for Emulsified Asphalt," Road and Paving Materials (2011)) and ASTM D2397-05 (ASTM International, "Standard Specification for Cationic Emulsified Asphalt," Road and Paving Materials (2011)). Examples of medium setting emulsions include, but are not limited to, CMS-2, CMS-2h, HFMS-2, MS-1, MS-2 and MS-2h.

Combining RAP with Emulsion

Without being limited to any mechanism or mode of action, emulsions coat RAP. For example, electrostatic interactions between the emulsion and RAP can cause components of the emulsion to plate out on, or adhere to, the surfaces of the RAP. In another example, adhesion forces between the emulsion and RAP exceed cohesion forces between the emulsified asphalt particles such that the emulsion adheres to the RAP. Emulsion adherence on the RAP can lead to flocculation and coalescence.

In various embodiments, the RAP is coated with the asphalt emulsion to increase the rate at which the emulsion-coated RAP sets, allow for strong bonds to form between the emulsion and RAP and/or provide smooth compacted recycled RAP when applied to a surface.

An emulsion can be combined with RAP in a fast continuous mixing machine, such as a pug mill. A pug mill simultaneously grinds materials and mixes them with liquid. A pug mill can produce a thoroughly mixed, homogeneous mixture in a few seconds. Water can also be combined with an emulsion and RAP in a pug mill.

In certain embodiments, the amount of emulsion used in the recycled RAP is less than the amount of emulsion used in conventional formulations. In some embodiments, the emulsion is greater than 1% by weight of RAP or greater than 2% by weight of RAP. In some embodiments, the emulsion is less than 3% by weight of RAP. In some embodiments, the emulsion is less than 2% by weight of RAP. In some embodiments, the emulsion is less than 1.75% by weight of RAP. In some embodiments, the emulsion is less than 1.5% by weight of RAP. In some embodiments, the emulsion is less than 1.25% by weight of RAP. In some embodiments, the emulsion is less than 1.0% by weight of RAP. In some embodiments, the emulsion is 1-2% by weight of RAP. In some embodiments, the emulsion is about 1.75% by weight of RAP. On a percentage basis, the amount of emulsion used in the presently disclosed recycled RAP is substantially lower than the amount of emulsion used in other formulations of recycled RAP. The ability to use less emulsion results in reduced cost, as well as the ability to use fewer potentially toxic chemicals in the recycled RAP.

The weight percent of emulsion used can be adjusted based on field conditions including, but not limited to, the ambient temperature and the desired setting time. For example, because lower ambient temperatures can lead to longer setting times, a higher weight percent of emulsion can be used to decrease the setting time.

Water

Water can be added to the RAP. Without being limited to any mechanism or mode of action, water helps an asphalt emulsion coat RAP. Water can also reduce the amount of emulsion that produces an emulsion-coated RAP. Water can also reduce the likelihood of an asphalt emulsion setting while in a stockpile.

Water can be added to the RAP at any time during the production of recycled RAP. For example, water can be added to RAP before emulsion is added. Alternatively, water can be added to RAP at the same time as an emulsion is added, or water can be to RAP after an emulsion is added.

In many variations, the quantity of water added to recycled RAP depends on the type of RAP that is used. Each type of RAP can absorb water. The potential absorption is reached when every RAP particle pore is filled with water and there is no excess water on the RAP particle surface. When the amount of water in a RAP is equal to the RAP's potential absorption, surface saturation has been reached. One example of a RAP surface saturation is 2.5 w/w % water.

Water can be added to RAP so that the total moisture content (i.e. total water content) is equal to potential absorption. Alternatively, water can be added to RAP in quantities such that the total moisture content exceeds potential absorption.

In some embodiments, RAP already has the desired water content and no additional water is added.

Water can be added to a final concentration 0.5% greater than RAP surface saturation. In some embodiments, water is added to a final concentration 1% greater than RAP surface saturation. In other embodiments, water is added to a final concentration 1.5% greater than RAP surface saturation. In still other embodiments, water is added to a final concentration 2% greater than RAP surface saturation.

Water can be added to a final concentration 2.5% greater than RAP surface saturation. In some embodiments, water is added to a final concentration 3% greater than RAP surface saturation. In other embodiments, water is added to a final concentration 3.5% greater than RAP surface saturation. In still other embodiments, water is added to a final concentration 4% greater than RAP surface saturation.

In some embodiments, water is added to a final concentration 2-2.5% greater than RAP surface saturation. In other embodiments, water is added to a final concentration of 4-5% total moisture content.

If recycled RAP is stored, water can be added before, during or after recycled RAP is stored. The amount of water added can be based on the desired storage duration. More water can be added for longer storage. Water can be added based on the moisture content results obtained from testing stored samples.

Additional Components of Recycled Reclaimed Asphalt Pavement

Any material that can be added to asphalt pavement can be added to recycled RAP. Examples of such materials include, but are not limited to, cement, lime, roofing shingles and tire rubber. Roofing shingles can be asphalt composite shingles.

Materials can be reduced in size before being added to recycled RAP. Materials can be reduced in size by any mechanism known in the art including, but not limited to, crushing, fractionating, ripping and shredding.

Any one or more of these materials can be added to recycled RAP at any time. For example, one or more of these materials can be added during production, such as in a pug mill. Alternatively, one or more of these materials can be added immediately prior to laying the recycled RAP on a surface.

Laying Recycled RAP

Recycled RAP can be applied to (laid on) a surface by any device or method known in the art. Examples of devices for laying recycled RAP include motor graders and lay-down machines.

Recycled RAP can be laid at any desired thickness to create a mat. For example, two to four inches of recycled RAP can be laid.

Compaction

Recycled RAP can be compacted by any device or method known in the art. Without being limited to any mechanism or mode of action, a compaction device provides compactive effort from, for example, its weight, its speed and by creating shear stress between compressed material and adjacent uncompressed material. Compactive effort rearranges aggregates in an asphalt pavement, densifies an asphalt pavement, reduces the volume of air in an asphalt pavement and forces water out of an asphalt pavement. Complete removal of water can help an asphalt pavement, such as recycled RAP, cure and achieve its full strength.

One example of a compaction device is a screed. A screed can be part of a paver, in which a self-leveling screed unit determines the profile of the asphalt material being placed by striking it off at the correct thickness. The screed can also provide initial mat compaction.

Another example of a compaction device is a pneumatic tire roller. Pneumatic tire rollers can include a front and back row of tires that are staggered such that the tires in one row are aligned with the gaps between tires in the other row. This tire arrangement can provide uniform and complete compaction over the width of the device. The tires can be smooth (without a tread). Tire pressure can be adjusted to change compactive effort. A release agent such as water can be used to minimize sticking of asphalt binder to the tires. The tire area can be insulated, such as with rubber matting or plywood, to help maintain tire temperature at or near pavement temperature during compaction.

Device weight and compactive effort can be adjusted by adding or removing ballast. Ballast can be any material known in the art including, but not limited to, water, sand, wet sand and steel.

A pneumatic tire roller can provide a kneading action. The kneading action can force water out of recycled RAP, which can help recycled RAP set and cure.

Another example of a compaction device is a drum (steel wheel or road) roller. Drum rollers can include one or more drums, which can compact material such as recycled RAP. The drums can be steel.

Drums can be static or vibrating. Drum vibration can add a dynamic load to the device weight which can create a greater total compactive effort. Drum vibration can also reduce friction and aggregate interlock during compaction, which allows aggregate particles to move into final positions that produce greater friction and interlock than could be achieved without vibration. Drum vibration can be produced using a free-spinning hydrostatic motor inside the drum; an eccentric weight can be attached to the motor shaft. Amplitude (eccentric moment) and frequency (speed of rotation) of vibration can be adjusted. Vibration amplitude and frequency can have a direct effect on dynamic force and thus on the compactive force.

A release agent such as water can be used to minimize sticking of asphalt binder to the drums.

Device weight and compactive effort can be adjusted by adding or removing ballast. Ballast can be any material known in the art including, but not limited to, water, sand, wet sand and steel.

Recycled RAP can be compacted by a series of compaction devices. Without being limited to any mechanism or mode of action, a series of compaction devices can produce a recycled RAP pavement with a greater density and greater smoothness than can be produced with a single method of compaction. The types of compaction devices used, number of devices used, sequence in which the devices are used and device speed can be varied based on the amount and type of compaction desired. The area on which each device is used, number of passes made by each device and pattern that each device follows can also be varied based on the amount and type of compaction desired.

One example of a compaction sequence includes the use of a screed. A screed can be used in a vibratory mode.

A screed can be followed by one or more rollers, including a breakdown roller. A breakdown roller can be any roller known in the art, including a vibratory drum roller or pneumatic tire roller.

A breakdown roller can be followed by an intermediate roller. An intermediate roller can be any roller known in the art, including a drum roller or pneumatic tire roller. A finish roller can be the last roller in a sequence. A finish roller can be any roller known in the art, including a static steel drum roller.

In some embodiments, a recycled RAP mat is compacted immediately after it has been laid. In other embodiments, a recycled RAP mat is compacted after it has set. In some embodiments, a recycled RAP mat is compacted first by a pneumatic roller until the recycled RAP stops tracking (displaying roller marks). Then the mat is compacted by one pass with a finish roller.

The devices and methods for compaction of recycled RAP can be adjusted based upon field conditions. The number and timing of passes made to compact recycled RAP can also be adjusted based upon field conditions. Any condition known in the art that affects the application of asphalt pavements to a surface including, but not limited to, the water content of the emulsion, the water content of the recycled RAP or the setting time of recycled RAP, can affect the compaction of recycled RAP.

For example, the rate at which water is absorbed by the RAP can affect setting time. Faster absorption can lead to faster setting and less need for compaction of recycled RAP. Alternatively, ambient temperature, humidity and wind speed affect water evaporation rates, surfactant migration and surfactant water release characteristics. These effects can change the rate at which recycled RAP sets. Alternatively, pressure from rollers can force water out of the recycled RAP. Pressure from rollers can also improve mix cohesion, cure and stability. Heavier rollers apply more pressure than lighter rollers. The type of roller or number of passes made by a roller can be based on how much pressure it will take to force water out or improve mix cohesion, cure or stability. Alternatively, the size distribution and number of fines can accelerate the rate at which asphalt pavement sets. Alternatively, intensity of the charge on the surface of aggregates can affect the asphalt pavement setting rate. High surface charge can lead to more rapid setting. Alternatively, cool emulsion and aggregate temperatures can retard setting. Warm or hot emulsion and aggregate temperatures can accelerate setting. Alternatively, different types of surfactants can be designed to have different effects on setting rate. Varying the amount of surfactant used can further affect setting rate.

Fog Seal Emulsion

A fog seal emulsion can be applied after recycled RAP has been laid down and compacted. Fog seal emulsions can be cationic, anionic or nonionic emulsions (as described above). Fog seal emulsions can include polymers (as described above). Fog seal emulsions can include solvents (as described above). Fog seal emulsions can include rejuvenators (as described above). Fog seal emulsions can be diluted versions of emulsions (as described above). One example of a fog seal emulsion is a composition that includes a predominantly asphaltene asphalt, a predominantly maltene recycling agent, a rubbery polymer or latex selected from styrene-butadiene-styrene, styrene butadiene rubber, neophrene latex and natural rubber, an surfactant and water (Koleas, U.S. Pat. No. 5,180,428). Another example of a fog seal emulsion is a composition that includes an asphalt binder, water, a cationic surfactant, a recycling agent and a cationic co-agglomerated styrene butadiene rubber latex, which includes sulfur and a vulcanizing agent (Takamura, U.S. Pat. No. 7,357,594).

Without being limited to any mechanism or mode of action, fog seal emulsions extend the life of recycled RAP. Fog seal emulsions decrease permeability, improve the ability of recycled RAP to prevent water from penetrating a base course or subgrade, reduce oxidation, close or seal cracks, reduce shrinkage, restore flexibility and fix construction defects.

In some embodiments, a fog seal emulsion is a highly polymerized cationic asphalt emulsion. A highly polymerized cationic asphalt emulsion can be any asphalt emulsion known in the art that includes polymers (as described above) and is cationic (as described above). Suitable fog seal emulsions include FastSet (Western Emulsions, Inc., Dana Point, Calif.).

Cold in-Place Recycling

Recycled RAP can be used in any cold in-place recycling ("CIR") process known in the art. CIR involves the removal, reprocessing and relaying of part of an existing asphalt surface without the use of heat. CIR processes can be environmentally friendly because, for example, they reduce the amount of virgin aggregate material being mined and used, reduce the amount of emulsion being manufactured and used, reduce the amount of toxic substances being produced and used, reduce the amount of toxic substances to which workers in the industry are exposed, reuse existing paving material, reduce energy consumption due to not heating the material and reduce emissions due to decreased material transportation and hauling. CIR processes can be economical because they reduce costs from, for example, reusing existing material, minimizing use of new materials, decreasing material transportation and hauling demands and not heating the material. Compared to applying a surface treatment to an existing surface, bridge and curb heights remain the same using CR.

CIR can include the removal of the top inches of an existing asphalt pavement. In some embodiments, the top 1 inch or more is removed. In some embodiments, the top 2 inches or more are removed. In other embodiments, the top 3 inches or more are removed.

In some embodiments, the top 6 inches or fewer are removed. In some embodiments, the top 5 inches or fewer are removed. In some embodiments, the top 4 inches or fewer are removed.

In some embodiments, the top 2 to 5 inches of an existing asphalt pavement are removed. Removal can be by milling, such as by a milling machine, which can pulverize the pavement.

The removed material can then be crushed and/or graded to produce a desired gradation. A desired gradation can specify a maximum particle size only. One example of a gradation is the removed material is less than 1¼ inch in diameter. Another example is the removed material is less than 1 inch in diameter. Virgin aggregate can be added to the removed material.

The material can then be mixed with a binding additive including, but not limited to, an asphalt emulsion, lime, portland cement or fly ash. The mixing can be performed by any machine known in the art including, but not limited to, a milling machine or a pug mill.

The material can then be returned to the milled surface and graded. Examples of machines that can be used for these steps are asphalt pavers and motor graders.

The recycled material can then be compacted (as described above).

One or more overlays can be applied to the recycled material. Examples of overlays include, but are not limited to, fog seals, tack coats, seal coats, chip seals and hot mix asphalt.

CIR can be performed by a combination of pieces of equipment (a train). A train can include two or more pieces of machinery mentioned above. A train can include an emulsion tanker, a water tanker, a milling machine, a crusher and a mix paver.

CIR can be used to, among other things, create a new pavement layer using the old pavement, remove cracks, ruts and potholes and rehabilitate a pavement surface.

Storing and Sampling

Recycled RAP can be used immediately after production. One example of immediate use is in a CIR process (as described above).

Recycled RAP can be stored (stockpiled) before being used. Recycled RAP can be stored with or without having been fractionated. Recycled RAP can be stored with or without the addition of one or more additives including, but not limited to, emulsions, polymers, solvents, rejuvenators and water.

Without being limited to any mechanism or mode of action, addition of a solvent-free rejuvenator (as described above) to recycled RAP extends the stockpile life of recycled RAP. Stockpile life of a recycled RAP can be the time during which particles of recycled RAP are able to adhere to each other or are compactable. A solvent-free rejuvenator stays in the recycled RAP and does not evaporate out of the stockpile.

Recycled RAP described herein can be stockpiled for more than three months. In some embodiments, recycled RAP is stockpiled for more than six months. In other embodiments, recycled RAP is stockpiled for more than nine months. In still other embodiments, recycled RAP is stockpiled for twelve months or longer.

In some embodiments, recycled RAP is stockpiled for less than twelve months. In other embodiments, recycled RAP is stockpiled for less than nine months. In still other embodiments, recycled RAP is stockpiled for less than six months.

Samples can be taken from recycled RAP stockpiles to determine characteristics of the recycled RAP including, but not limited to, its water content, aggregate gradation, asphalt binder content and bulk specific gravity. Accurate sampling can help determine desired field mix design.

Sampling of recycled RAP can involve taking a number of random samples from one or more stockpiles, testing a portion of each individual sample, and then combining the remainder of the random samples into one representative sample for developing a mix design. Any sampling procedure known in the art for virgin aggregates can be used for sampling recycled RAP. One example of a sampling procedure is AASHTO T 2-91 (American Association of State Highway and Transportation Officials, "Sampling of Aggregates," Standard Specifications for Transportation Materials and Methods of Sampling and Testing (31$^{st}$ ed., 2011)).

Any testing requirements and testing frequencies known in the art can be used for testing samples of recycled RAP. Testing requirements and testing frequencies can be established by, for example, federal, regional, state or local agencies and professional transportation associations.

Laboratory gradations of RAP samples can be produced that mimic field gradations of RAP. One example of a laboratory process that produces gradations that mimic field gradations is passing laboratory-produced RAP through a sieve one size bigger than that which will be used in the field.

One example of an aggregate gradation test is provided in AASHTO T 30-10 (American Association of State Highway and Transportation Officials, "Mechanical Analysis of Extracted Aggregate," Standard Specifications for Transportation Materials and Methods of Sampling and Testing (31$^{st}$ ed., 2011)).

One example of a testing method to determine asphalt binder content is provided in AASHTO T 164-11 (American Association of State Highway and Transportation Officials, "Quantitative Extraction of Asphalt Binder from Hot Mix Asphalt," Standard Specifications for Transportation Materials and Methods of Sampling and Testing (31$^{st}$ ed., 2011)).

One example of a bulk specific gravity test is provided in "Reclaimed Asphalt Pavement in Asphalt Mixtures: State of the Practice" (U.S. Dept. of Transportation, Federal Highway Admin., Publication No. FHWA-HRT-11-021 (2011)).

Courses and Grades

Recycled RAP can be used for any purpose known in the art, including any purpose for which virgin asphalt pavement can be used. For example, recycled RAP can be used for shoulder widening, pothole patching, as a base material and as a wearing course. The wearing (surface) course is the top layer of a road pavement and is usually designed to be durable, resistant to water penetration, resistant to deformation by traffic and have a high resistance to skidding.

Kits

Any two or more of a RAP, an emulsion and water can be combined to comprise a kit. The emulsion can include one or more polymers, solvents or rejuvenators. A kit can include RAP that has been combined with an emulsion to form an emulsion-coated RAP. In some embodiments, a kit includes instructions for combining or using the RAP, an emulsion, water and emulsion-coated RAP.

EXAMPLES

The following examples illustrate various aspects of the disclosure, and should not be considered limiting.

Example 1

Emulsion Testing

The traditional emulsions used to manufacture recycled RAP contained volatile solvents. The type of emulsion that was most often used was a CMS-2S-type emulsion. CMS-2S is considered a "commodity" emulsion and is available in the same basic formulation from multiple suppliers. CSS-1H, which does not contain volatile solvents, is also a commodity-type emulsion available from multiple suppliers.

The same mix design testing was performed on CSS-1H with RAP as is performed on CMS-2S with RAP, using design criteria established by the Texas Department of Transportation ("TxDOT"). It was shown that RAP processed with 2-3% CSS-1H and 2% added water could meet specified design criteria (e.g., 2% emulsion yielded unconfined compressive strength test results of 42.5 psi; 2.5% emulsion yielded 38.4 psi; and 3% emulsion yielded 37.9 psi).

However, given that CSS-1H contained no solvents or rejuvenating agents, the CSS-1H-processed material did not last long in a stockpile. Testing showed that CSS-1H-processed recycled RAP had a viable stockpile life of less than one week.

A field trial was performed with CSS-1H recycled RAP for the Dallas District of TxDOT, near the city of Waxahatchie, Tex. Such a trial was possible because the material was not required to be stored in a stockpile; rather, it was used immediately upon production to build a foundation to support a median barrier. The material processed with CSS-1H performed well, showing that for immediate use, RAP processed with a solvent-free asphalt emulsion worked as well as RAP processed with emulsions containing solvents.

Example 2

Water Testing

The water content required for recycled RAP produced with both types of emulsion in Example 1 was studied. Results demonstrated that recycled RAP prepared with a solvent-free emulsion (CSS-1H) required more water in the field than did recycled RAP prepared with a solvent-containing emulsion (CMS-2S) (4-5% total moisture content compared to 2.5% total moisture content, respectively).

RAP processed with emulsions containing solvents typically require about 2.5% moisture (whether already present in the RAP stockpile prior to processing or added during processing). The 2.5% moisture used in RAP processed with solvent-containing emulsions represents the typical point of saturation for the aggregates in most RAP. Without being limited to any mechanism or mode of action, the additional moisture requirement of solvent-free emulsions in this example is likely caused by the need for additional lubrication of the RAP aggregates for solvent-free emulsions to fully coat the aggregate particles and perform properly when applied with a screed or other mechanized device. This lubrication is provided by the solvent in a solvent-containing emulsion and by the heat in hot-applied asphalt cements.

Example 3

Emulsion Testing at a Given Moisture Content

The amount of emulsion required for recycled RAP prepared with both types of emulsions in Example 1 with various amounts of water was studied. Results demonstrated that recycled RAP prepared with a solvent-free emulsion required approximately half as much, or less, emulsion than did recycled RAP prepared with a solvent-containing emulsion, at any given water amount. For example, recycled RAP prepared without any added water and with a solvent-free emulsion required 2.5-3% emulsion. Recycled RAP prepared without any added water and with a solvent-containing emulsion required 6.5-7% emulsion, a more than two-fold increase. Recycled RAP prepared at 4-5% total moisture content and with a solvent-free emulsion required 1.5-2% emulsion. Recycled RAP prepared at 4-5% total moisture content and with a solvent-containing emulsion required 2.5-3% emulsion, a 1.5-fold increase.

Example 4

Lab and Field Gradation

One of the factors that had traditionally hindered the mix design/field production process of recycled RAP was that the RAP material, as prepared for testing in the mix design lab, had a very different gradation (that is, the size of the individual processed RAP particles) than the material that had been processed in the field. Without exception, the RAP processed in the lab was of a finer gradation (had more small particles, or "fines") than RAP processed in the field. This is because the gradation guidelines found in, for example, TxDOT specifications typically allowed only for a top-end gradation (for example, "100% of the recycled RAP passing the 1.25-inch sieve."). However, the small size of the RAP material processed in the lab (relative to the large production quantities produced in the field), and the greater speed at which field RAP was processed meant that the RAP that was used for lab testing was typically crushed to a finer gradation.

The fact that the lab RAP material had a finer gradation meant that lab-molded material had greater structure, density, and "looked" better than field-produced material. Finer material also tended to perform better when applied by a machine (either lay-down machine or motor grader) than courser material. Sand was often added to recycled RAP produced in the field. Emulsion coated the RAP material (including added sand) indiscriminately, so the uncoated sand particles, which require more emulsion than the RAP particles which are already coated with oxidized asphalt, were always undercoated if emulsion is added pursuant to the RAP requirement, or the RAP particles were over-coated if coated to the sand requirement. Also, adding sand during the production process requires additional equipment (e.g., vane feeder) and cost, along with the additional cost of the sand.

To overcome these problems, the approach was taken that no added sand should be used. The problem of properly coating both the sand and RAP with the appropriate amount of emulsion cannot be overcome without a great deal of expensive additional processing. Field processed RAP material from various jobs were sampled and their gradations post-field processing were determined. Using this information, it is now possible to determine the gradation that will result in the best overall field-produced gradation. Results demonstrated that using a screen one size bigger than that available in the field led to a lab-produced RAP gradation that matched a field-produced gradation.

Example 5

Emulsion Selection

Emulsions for recycling RAP were tested. The criteria were that the emulsion produce a solvent-free recycled RAP product that met established TxDOT criteria immediately upon production and lasted in a stockpile. The emulsion that best met these criteria is a type of solvent-free emulsion produced by Western Emulsions, Inc. (Dana Point, Calif.) and marketed under the brand name PASS-R. Lab testing showed that PASS-R performed better than CMS-2S initially and at lower amounts that CMS-2S. One of the reasons that PASS-R can be used to recycle RAP at lower contents than CMS-2S is that PASS-R coats much better than CMS-2S. For example, when recycled RAP was processed with either CMS-2S or PASS-R, both at 5% by weight of aggregate, the RAP processed with CMS-2S still looked like dry rock particles, whereas the RAP processed with PASS-R looked like well-coated particles.

Example 6

Process Testing in the Field

After lab testing, a field trial was performed in Parker County, Tex. using RAP that was processed pursuant to the methodologies described above and mixed with PASS-R emulsion. Molds and "skin patch" testing in the field showed that the material performed well initially, as expected from the lab results.

Seven hundred fifty tons of the material was then produced, at varying moisture contents, and stockpiled for six months (which is the absolute longest amount of time RAP processed with any type of emulsion has been shown to last in a stockpile) to determine whether the material would perform well in a stockpile. After six months, the stockpiled material was used to widen a roadway in Parker County, and it performed perfectly. For example, compaction was evident where a blade tire had passed over the surface. During field application, it was also determined that the appropriate moisture content for stockpiled RAP was much higher than the "surface saturation optimum" that had been commonly used previously. Subsequent projects have shown that RAP processed with PASS-R using the methods (and proper moisture contents) disclosed herein lasted up to one year in a stockpile, depending on weather conditions, which is far longer than RAP processed using any other emulsion with any other methodology.

During the Parker County field trial, and during subsequent projects, it has also been determined that the most effective application for recycled RAP as a paving material is to apply the material (either with a motor grader or lay-down machine) at a thickness of 2" to 4" and roll it first with a pneumatic roller until the material stops tracking, then one pass with a finish roller.

Example 7

Recycled RAP as a Wearing Course

After the successful field trial in Parker County, the fully developed process—mix design methodology, production method, PASS-R emulsion, moisture content, and application method—was used to produce approximately 10,000 tons of material for the Abilene District of TxDOT. The produced material was used to pave a long section of a low traffic volume roadway, and it performed well initially as a wearing course without the use of a surface treatment.

Subsequent projects have shown that RAP recycled using the methods disclosed herein and PASS-R emulsion produced RAP material of higher initial quality, greater stockpile life and greater long-term quality than RAP produced using any other method. RAP produced using these methods may also be used as a wearing course, which is not possible with RAP produced using any other method.

The above specification and examples provide a complete description of the structure and use of exemplary embodiments of recycled RAP. Although various embodiments have been described above with a certain degree of particularity, or with reference to one or more individual embodiments, those skilled in the art could make numerous alterations to the disclosed embodiments without departing from the spirit or scope of this disclosure. Other embodiments are therefore contemplated. All matter contained in the above description is illustrative only of particular embodiments and not limiting. Changes in detail or structure may be made without departing from the basic elements described herein.

What is claimed is:

1. A formulation of recycled reclaimed asphalt pavement comprising:
    a reclaimed asphalt pavement;
    an emulsion at less than 1.25% by weight of the reclaimed asphalt pavement; and
    water.

2. The formulation of claim 1, wherein the reclaimed asphalt pavement is reprocessed asphalt paving materials.

3. The formulation of claim 1, wherein the reclaimed asphalt pavement and emulsion are combined to form an emulsion-coated reclaimed asphalt pavement.

4. The formulation of claim 1, wherein the emulsion is a polymer-modified cationic slow setting emulsified asphalt with a solvent-free rejuvenator.

5. The formulation of claim 1, wherein the water is 2-2.5% greater than surface saturation of the reclaimed asphalt pavement.

6. The formulation of claim 1, wherein the reclaimed asphalt pavement passes through a 1¼-inch sieve.

7. A method of making recycled reclaimed asphalt pavement comprising:
    fractionating a reclaimed asphalt pavement to form a fractionated reclaimed asphalt pavement; and
    combining the fractionated reclaimed asphalt pavement, an emulsion at less than 1.25% by weight of the reclaimed asphalt pavement, and water.

8. The method of claim 7, wherein the reclaimed asphalt pavement is reprocessed asphalt paving materials.

9. The method of claim 7, wherein the fractionated reclaimed asphalt pavement passes through a 1¼-inch sieve.

10. The method of claim 7, wherein the combining of the fractionated reclaimed asphalt pavement and the emulsion forms an emulsion-coated fractionated reclaimed asphalt pavement.

11. The method of claim 7, wherein the combining is in a pug mill.

12. The method of claim 7, wherein the emulsion is a polymer-modified cationic slow setting emulsified asphalt with a solvent-free rejuvenator.

13. The method of claim 7, wherein the water is 2-2.5% greater than surface saturation of the reclaimed asphalt pavement.

14. The method of claim 7, further comprising storing the recycled reclaimed asphalt pavement in a stockpile for more than six months.

15. A method of using recycled reclaimed asphalt pavement comprising:
    applying a recycled reclaimed asphalt pavement comprising a reclaimed asphalt pavement that has been fractionated, an emulsion at less than 1.25% by weight of the reclaimed asphalt pavement, and water to a surface; and
    compacting the recycled reclaimed asphalt pavement on the surface.

16. The method of claim 15, wherein the reclaimed asphalt pavement is reprocessed asphalt paving materials.

17. The method of claim 15, wherein the reclaimed asphalt pavement passes through a 1¼-inch sieve.

18. The method of claim 15, wherein the emulsion is a polymer-modified cationic slow setting emulsified asphalt with a solvent-free rejuvenator.

19. The method of claim 15, wherein the water is 2-2.5% greater than surface saturation of the reclaimed asphalt pavement.

20. The method of claim 15, further comprising storing the recycled reclaimed asphalt pavement for more than six months before applying it to a surface.

21. The method of claim 15, wherein the recycled reclaimed asphalt pavement is applied as a wearing course.

22. The method of claim 15, wherein the compacting is by a pneumatic roller.

23. The method of claim 15, wherein the compacting is by a pneumatic roller followed by a finish roller.

24. The method of claim 15, further comprising adding a fog seal emulsion.

25. A kit comprising:
 a reclaimed asphalt pavement;
 an emulsion at less than 1.25% by weight of the reclaimed asphalt pavement; and
 instructions for combining or using the reclaimed asphalt pavement and emulsion.

* * * * *